(12) United States Patent
Mattar et al.

(10) Patent No.: US 12,008,402 B2
(45) Date of Patent: Jun. 11, 2024

(54) DETERMINING COMPUTER RESOURCE USAGE AT MULTIPLE LEVELS OF A CONTAINER ORCHESTRATION SYSTEM HIERARCHY

(71) Applicant: Red Hat, Inc., Raleigh, NC (US)

(72) Inventors: Steve Mattar, Ra'anana (IL); Arie Bregman, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 466 days.

(21) Appl. No.: 17/459,670

(22) Filed: Aug. 27, 2021

(65) Prior Publication Data

US 2023/0063541 A1    Mar. 2, 2023

(51) Int. Cl.
  *G06F 9/50* (2006.01)
  *G06F 3/06* (2006.01)

(52) U.S. Cl.
  CPC .......... *G06F 9/5005* (2013.01); *G06F 3/0604* (2013.01); *G06F 3/0644* (2013.01); *G06F 3/0673* (2013.01)

(58) Field of Classification Search
  CPC ........ G06F 9/50; G06F 9/5005; G06F 9/5011; G06F 9/5016
  See application file for complete search history.

(56) References Cited

U.S. PATENT DOCUMENTS

| | | | |
|---|---|---|---|
| 10,007,537 B2 * | 6/2018 | Emelyanov | ........... G06F 9/4555 |
| 10,191,778 B1 | 1/2019 | Yang et al. | |
| 10,303,576 B1 | 5/2019 | Seymour et al. | |
| 10,606,670 B2 * | 3/2020 | Zhao | ................... G06F 12/1009 |
| 11,487,571 B2 * | 11/2022 | Soppin | ................ G06F 9/45558 |

(Continued)

FOREIGN PATENT DOCUMENTS

| | | |
|---|---|---|
| CN | 108694071 A | 10/2018 |
| CN | 110912773 A | 3/2020 |
| CN | 112085535 A | 12/2020 |

OTHER PUBLICATIONS

Chang, C. et al., "A Kubernetes-Based Monitoring Platform for Dynamic Cloud Resource Provisioning," Globecom 2017—2017 IEEE Global Communications Conference, Dec. 4-8, 2017, Singapore, IEEE, 6 pages.

(Continued)

*Primary Examiner* — Andy Ho
(74) *Attorney, Agent, or Firm* — Dority & Manning, P.A.

(57) ABSTRACT

A monitor process identifies a first container executing on a worker node of a container orchestration system comprising a plurality of worker nodes, each worker node including a control plane component configured to execute a container in response to a request from a scheduler. The monitor process identifies a control group (cgroup) that corresponds to the first container. The monitor process generates a first resource utilization structure that corresponds to the first container. The monitor process, for each respective time of a plurality of successive times, obtains, by the monitor process, from the cgroup, one or more computer resource utilization values that identify real-time memory utilization of the first container at the respective time of the plurality of successive times. The monitor process stores, in the first resource utilization structure, computer resource utilization information based on the one or more computer resource utilization values.

20 Claims, 6 Drawing Sheets

(56) References Cited

U.S. PATENT DOCUMENTS 11,838,206 B2 * 12/2023 Wang ................ H04L 45/58
2022/0083383 A1 * 3/2022 Ylinen ............... G06F 9/4843

OTHER PUBLICATIONS

Medel, V. et al., "Characterising resource management performance in Kubernetes," Computers and Electrical Engineering, vol. 68, May 2018, Elsevier Ltd., pp. 286-297.

* cited by examiner

DETERMINING COMPUTER RESOURCE USAGE AT MULTIPLE LEVELS OF A CONTAINER ORCHESTRATION SYSTEM HIERARCHY

BACKGROUND

Container orchestration systems often utilize a variety of resources, sometimes referred to as objects, such as namespaces, deployments, pods and containers, during the execution of a container-based system. Such resources facilitate the implementation of desirable features, such as isolation between different tenants of the container orchestration system, simplified inter-container communication, automatic scaling, scope of names, and the like.

SUMMARY

The examples disclosed herein implement the determination of computer resource usage at multiple levels of a container orchestration system hierarchy.

In one example a method is provided. The method includes identifying, by a monitor process executing on a computing device, a first container executing on a worker node of a container orchestration system comprising a plurality of worker nodes, each worker node comprising a control plane component configured to execute a container in response to a request from a scheduler. The method further includes identifying a control group (cgroup) that corresponds to the first container. The method further includes generating a first resource utilization structure that corresponds to the first container. The method further includes, for each respective time of a plurality of successive times, obtaining, by the monitor process, from the cgroup, one or more computer resource utilization values that identify real-time memory utilization of the first container at the respective time of the plurality of successive times. The method further includes storing, in the first resource utilization structure, computer resource utilization information based on the one or more computer resource utilization values.

In another example a computing device is provided. The computing device includes a memory and a processor device coupled to the memory. The processor device is to identify a first container executing on a worker node of a container orchestration system comprising a plurality of worker nodes, each worker node comprising a control plane component configured to execute a container in response to a request from a scheduler. The processor device is to identify a control group (cgroup) that corresponds to the first container. The processor device is to generate a first resource utilization structure that corresponds to the first container. The processor device is to, for each respective time of a plurality of successive times, obtain, by the monitor process, from the cgroup, one or more computer resource utilization values that identify real-time memory utilization of the first container at the respective time of the plurality of successive times. The processor device is to store, in the first resource utilization structure, computer resource utilization information based on the one or more computer resource utilization values.

In another example a non-transitory computer-readable storage medium is provided. The non-transitory computer-readable storage medium includes executable instructions configured to cause a processor device to identify a first container executing on a worker node of a container orchestration system comprising a plurality of worker nodes, each worker node comprising a control plane component configured to execute a container in response to a request from a scheduler. The instructions further cause the processor device to identify a control group (cgroup) that corresponds to the first container. The instructions further cause the processor device to generate a first resource utilization structure that corresponds to the first container. The instructions further cause the processor device to, for each respective time of a plurality of successive times, obtain, by the monitor process, from the cgroup, one or more computer resource utilization values that identify real-time memory utilization of the first container at the respective time of the plurality of successive times. The instructions further cause the processor device to store, in the first resource utilization structure, computer resource utilization information based on the one or more computer resource utilization values.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
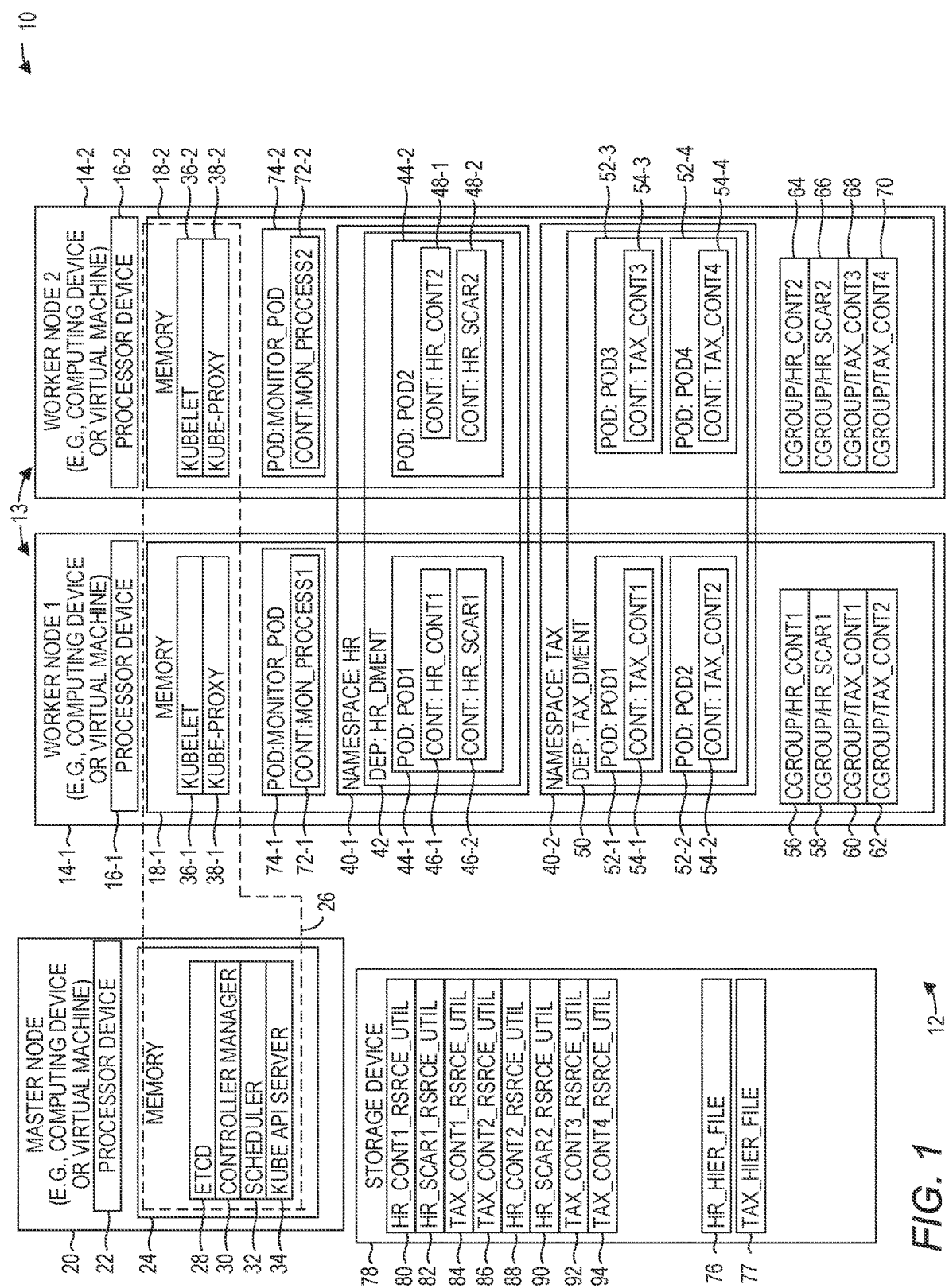
FIG. 1 is a block diagram of an environment suitable for implementing the determination of computer resource usage at multiple levels of a container orchestration system hierarchy according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Kubernetes, available at Kubernetes.io, is a cluster-based container orchestration system that utilizes a variety of resources, sometimes referred to as objects, such as namespaces, deployments, pods, and containers, during the execution of a container-based system. Such resources facilitate the implementation of desirable features, such as isolation between different tenants of the container orchestration system, simplified inter-container communication, automatic scaling, scope of names, and the like.

Kubernetes utilizes a plurality of worker nodes, such as virtual machines and/or bare metal machines, on which pods can be deployed. A pod can include one or more containers. The term "container" as used herein, refers to a running instance of a container image that is initiated by a container runtime, such as CRI-O or containerd. The phrase "container image" as used herein refers to a static package of software comprising one or more layers, the layers including everything needed to run an application (i.e., as a container) that is initiated from the container image, including, for example, one or more of executable runtime code, system tools, system libraries and configuration settings. A Docker® image is an example of a container image.

A worker node in a Kubernetes cluster has a finite amount of computer resources, such as memory resources, processor resources, networking resources, storage device resources, and the like, that are often shared among multiple different groups of users. The different groups of users may be different customers (sometimes referred to as "tenants") of a cloud computing provider, may be different departments of an entity, or may be any other desired division of groups of users. Kubernetes shares and isolates the computer resources of the cluster via a resource referred to as a namespace. A namespace is a mechanism that facilitates virtual clusters on a physical Kubernetes cluster of worker nodes. Virtual clusters allow Kubernetes to treat each virtual cluster as if it is the only cluster on a cluster of worker nodes, and thus different groups of users can share a physical cluster of worker nodes and yet remain isolated from one another. If desired, namespaces can be used in conjunction with access rights to completely isolate two separate groups of users such that containers executing in one namespace cannot communicate with containers executing in another namespace that is using the same physical computing devices. A namespace also provides a scope for the names of other resources, such as pods, containers, deployments, and the like. Names of resources must be unique in a namespace.

Kubernetes implements a deployment resource object (hereinafter referred to as a deployment for the sake of brevity) to facilitate life cycle management of containers. A deployment may identify the number of pods that are desired, the container images to use for containers, and the like. Namespaces, deployments, pods, and containers may be viewed as hierarchical in that a container "runs in" a pod (sometimes referred to as a container being associated with a pod), a pod "runs in" a deployment (sometimes referred to as a pod being associated with a deployment), and a deployment "runs in" a namespace (sometimes referred to as a deployment being associated with a namespace).

It may be desirable for an owner/user of a namespace to understand computer resource utilization of containers at various levels of this hierarchy. For example, it may be desirable for a user of a namespace to know the entire aggregate computer resource usage associated with all the deployments that run in a namespace. It may also be desirable for a user to know the aggregate computer resource usage associated with each individual deployment. It may also be desirable for a user to know the aggregate computer resource usage associated with each pod that runs in a deployment. Note that the containers that are running may be, and likely are, running on multiple worker nodes of the Kubernetes cluster. Knowing such computer resource usage can help the user predict necessary computer resource expansion, likely costs associated with the use of such computer resources, which pods, deployments, or namespaces utilize the most computer resources, the particular computer resources used by each pod, deployment, or namespace, and the like. Determining the computer resource utilization of containers at the level of namespaces, deployments, and pods can also facilitate computer resource billing based on namespaces, deployments, or pods.

The examples disclosed herein implement the determination of computer resource usage at multiple levels of a container orchestration system hierarchy. The examples identify running containers on worker nodes of a container orchestration cluster and access a corresponding control group (cgroup) that identifies real-time computer resource utilization values, such as memory usage, processor usage, network usage, storage device usage, and the like. Multiple resources in which the containers run are determined, such as a namespace, a deployment, a pod, and the like. The computer resource usage at each level of the hierarchy can then be determined, such as computer resource usage for each pod, for each deployment and each namespace. If desired, billing rates for computer resource usage may be obtained, such as a cost of memory usage, processor usage, network usage and storage device usage, and calculated at each level of the container orchestration system hierarchy.

FIG. 1 is a block diagram of an environment 10 suitable for implementing the determination of computer resource usage at multiple levels of a container orchestration system hierarchy according to one example. FIG. 1 includes a container orchestration system 12 that is configured to deploy, manage and scale containerized applications. In some examples the container orchestration system 12 comprises the Kubernetes container orchestration system. The container orchestration system 12 includes a cluster 13 of worker nodes 14-1 and 14-2 (generally, worker nodes 14), which in this example comprise bare metal machines rather than virtual machines, but in other implementations the cluster of worker nodes may comprise virtual machines implemented on bare metal machines. Although for simplicity and purposes of explanation only two worker nodes 14 are illustrated, in practice, the container orchestration system 12 may include tens, hundreds or even thousands of worker nodes 14 in a single cluster. The worker nodes 14-1, 14-2 comprise computing devices that each have corresponding one or more processor devices 16-1, 16-2 and memories 18-1, 18-2. The container orchestration system 12 includes a master node 20 that includes one or more processor devices 22 and a memory 24.

The container orchestration system 12 implements a control plane 26 that comprises a plurality of control plane components. In this example, the control plane 26 includes an ETCD 28 control plane component that is a distributed key-value store that provides a mechanism for storing data.

The control plane 26 includes a controller manager 30 control plane component that monitors the shared state of the cluster 13 and makes changes attempting to move the current state of the cluster 13 to the desired state. The control plane 26 includes a scheduler 32 control plane component that assigns pods to the worker nodes 14. The control plane 26 includes a Kube application programming interface (API) server 34 control plane component that exposes various functions of the container orchestration system 12 to other programs, such as an operator command line interface front end, and the like.

The control plane 26 comprises control plane components that are distributed across both the master node 20 and the worker nodes 14-1, 14-2. The worker node 14-1 includes a kubelet 36-1 control plane component which serves as a node agent for the worker node 14-1 and responds to requests from control plane components executing on the master node 20. For example, the kubelet 36-1 establishes pods on the worker node 14-1 and causes the initiation of containers on the worker node 14-1 based on decisions of the scheduler 32. The worker node 14-1 includes a kube proxy 38-1 control plane component that facilitates network communications between pods and provides other network services. The worker node 14-2 similarly includes a kubelet 36-2 control plane component and a kube proxy 38-2 control plane component.

At the instance in time illustrated in FIG. 1, the cluster 13 includes a namespace 40-1 with a name of HR and a namespace 40-2 with a name of TAX. In this example, the namespaces 40-1, 40-2 comprise virtual clusters for human resource employees and tax employees of a company. The namespaces 40-1, 40-2 may be associated with access rights such that HR employees have no access to the namespace 40-2 and tax employees have no access to the namespace 40-1. Containers executing in the namespace 40-1 may have no knowledge of, or ability to communicate with, containers executing in the namespace 40-2, and containers executing in the namespace 40-2 may have no knowledge of, or ability to communicate with, containers executing in the namespace 40-1. The namespaces 40-1, 40-2 also define name scope for the resources running in the respective namespaces. Thus, names of resources running in the namespaces 40-1, 40-2 are unique within the respective namespaces 40-1, 40-2.

The namespace 40-1 is illustrated as encompassing the worker nodes 14-1 and 14-2 because, from the perspective of the container orchestration system 12, the namespace 40-1 is implemented on any worker node 14 on which a pod or container associated with the namespace 40-1 is initiated. The namespace 40-1 includes a deployment 42 with a name of HR_DMENT. Generally, a deployment implements life cycle management of pods and containers. A deployment may identify the number of pods that are desired, the container images to use for containers, and the like, and cause the desired number of pods and containers to be initiated on the cluster 13. The deployment 42 is illustrated as encompassing the worker nodes 14-1 and 14-2 because, from the perspective of the container orchestration system 12, the deployment 42 is implemented on any worker node 14 on which a pod or container associated with the deployment 42 is initiated. While for purposes of illustration only one deployment is illustrated, in practice, a namespace typically has multiple different deployments.

The deployment 42 includes two pods 44-1 and 44-2. The pod 44-1 is initiated on the worker node 14-1 and the pod 44-2 is initiated on the worker node 14-2. Generally, a pod is a resource, sometimes referred to as an object, that comprises one or more containers. Pods are defined in a pod template, and the deployment 42 caused the initiation of the pods 44-1, 44-2 based on a particular pod template. The pod 44-1 includes a container 46-1 and a container 46-2. The container 46-1 and the container 46-2 are thus associated with the pod 44-1. The pod 44-2 includes a container 48-1 and a container 48-2. The container 48-1 and the container 48-2 are thus associated with the pod 44-2. The pods 44-1 and 44-2 are initiated by the deployment 42 from the same pod definition, or template. The containers 46-1 and 48-1 are initiated from the same container image and implement the same functionality, and the containers 46-2 and 48-2 are initiated from the same container image and implement the same functionality. The deployment 42 may be defined to initiate and maintain two copies of pods and, in response to such definition, initiate or cause the initiation of the pods 44-1 and 44-2 and the containers 46-1, 46-2, 48-1, and 48-2.

The namespace 40-2 includes a deployment 50 with a name of TAX_DMENT. The deployment 50 includes four pods 52-1-52-4, the pods 52-1 and 52-2 are on the worker node 14-1, and the pods 52-3 and 52-4 are on the worker node 14-2. The pod 52-1 includes a container 54-1; the pod 52-2 includes a container 54-2; the pod 52-3 includes a container 54-3; and the pod 52-4 includes a container 54-4. The pods 52-1-52-4 are initiated by the deployment 50 from the same pod definition, or template. The containers 54-1-54-4 are initiated from the same container image and implement the same functionality. The deployment 50 may be defined to initiate and maintain four copies of pods and, in response to such definition, initiate or cause the initiation of the pods 52-1-52-4 and the containers 54-1-54-4.

The container orchestration system 12 automatically, upon initiation of a container on the worker nodes 14-1, 14-2, generates a cgroup for each container. A cgroup, such as a Linux cgroup, is a feature of an operating system, such as the Linux operating system, that may be used to limit the computer resources used by a container. A cgroup also maintains real-time computer resource utilization values, such as memory utilization values that identify the amount of memory used by the container at a current point in time, processor device utilization values, storage device utilization values, and network utilization values.

A cgroup may include files, such as a memory.stat file, that can be read to obtain real-time memory resource utilization values, such as, by way of non-limiting example, a cache value that identifies a real-time number of bytes of page cache memory, a resident set size (rss) value that identifies a real-time number of bytes of anonymous and swap cache memory (includes transparent hugepages), an rss_huge value that identifies a real-time number of bytes of anonymous transparent hugepages, a mapped_file value that identifies a real-time number of bytes of mapped file (includes TMPFS/SHMEM), a pgpgin value that identifies a real-time number of charging events to the memory cgroup (the charging event happens each time a page is accounted as either mapped anon page (RSS) or cache page (Page Cache) to the cgroup), a pgpgout value that identifies a real-time number of uncharging events to the memory cgroup (the uncharging event happens each time a page is unaccounted from the cgroup), a swap value that identifies a real-time number of bytes of swap usage, a dirty value that identifies a real-time number of bytes that are waiting to get written back to the disk, a writeback value that identifies a real-time number of bytes of file/anon cache that are queued for syncing to disk, an inactive_anon value that identifies a real-time number of bytes of anonymous and swap cache memory on an inactive least recently used (LRU) list, an active_anon value that identifies a real-time number of bytes of anonymous and swap cache memory on an active LRU list, an inactive_file value that identifies a real-time number of bytes of file-backed memory on the inactive LRU list, and an active_file value that identifies a real-time number of bytes of file-backed memory on the active LRU list, an unevictable value that identifies a real-time number of bytes of memory that cannot be reclaimed (mlocked etc.).

Similar information may be obtained for processor utilization values, network values, and storage device values. For example, a cgroup may include a cpuact.usage file that can be read to obtain aggregate real-time processor resource utilization values. A cgroup may also include a blkio-.throttle.io_service_bytes file that can be read to obtain aggregate real-time amounts of data (e.g., such as in bytes of data) that have been sent to and retrieved from a storage device.

In this example, the worker node 14-1 includes a cgroup 56 that corresponds to the container 46-1 and contains real-time computer resource values for the container 46-1, a cgroup 58 that corresponds to the container 46-2 and contains real-time computer resource values for the container 46-2, a cgroup 60 that corresponds to the container 54-1 and contains real-time computer resource values for the container 54-1, and a cgroup 62 that corresponds to the container 54-2 and contains real-time computer resource values for the container 54-2.

In this example, the worker node 14-2 includes a cgroup 64 that corresponds to the container 48-1 and contains real-time computer resource values for the container 48-1, a cgroup 66 that corresponds to the container 48-2 and contains real-time computer resource values for the container 48-2, a cgroup 68 that corresponds to the container 54-3 and contains real-time computer resource values for the container 54-3, and a cgroup 70 that corresponds to the container 54-4 and contains real-time computer resource values for the container 54-4.

With this background, an example of determining computer resource usage at multiple levels of the container orchestration system hierarchy will be discussed. A monitor process is initiated on each worker node 14 in the cluster 13 that operates to obtain, from the corresponding cgroup files, the computer resource values that identify real-time resource utilization of the corresponding containers. In this example, the monitor processes are monitor containers 72-1 and 72-2 that execute in monitor pods 74-1 and 74-2 on the worker nodes 14-1, 14-2, respectively. It is noted, however, that in other implementations the monitor processes may not be containerized.

The monitor container 72-1 determines the real-time resource utilization values of the containers executing on the worker node 14-1, and the monitor container 72-2 determines the real-time resource utilization values of the containers executing on the worker node 14-2. The monitor container 72-1 periodically, such as every second, every five seconds, every ten seconds, or some other interval, queries the Kube API server 34 and requests the names of all the containers executing on the worker node 14-1. The monitor container 72-1 then, using the names of the containers received from the Kube API server 34, determines the corresponding cgroups 56, 58, 60, or 62. In this example, the filename of each cgroup 56, 58, 60, or 62 includes the name of the container to which the cgroup 56, 58, 60, or 62 corresponds. The monitor container 72-1 obtains the names of the cgroups 56, 58, 60, or 62, parses the names and matches the names to the names of the containers. The monitor container 72-1 determines that the cgroup 56 contains the real-time resource utilization values of the container 46-1, the cgroup 58 contains the real-time resource utilization values of the container 46-2, the cgroup 60 contains the real-time resource utilization values of the container 54-1, and the cgroup 62 contains the real-time resource utilization values of the container 54-2.

In one implementation, the monitor container 72-1 obtains access to the cgroups via a pod definition of the monitor pod 74-1, as illustrated in Table 1, below, wherein the cgroups are maintained by default in a/sys/fs/cgroup volume on the worker nodes and wherein the volume is mounted to the container via a volume mount.

TABLE 1

```
apiVersion: v1
kind: Pod
metadata:
  name: MONITOR_POD
spec:
  containers:
  - image: MON_PROCESS_IMAGE
    name: MON_PROCESS
    volumeMounts:
    - mountPath: /cgroup
      name: cgroup-volume
  volumes:
  - name: cgroup-volume
    hostPath:
      path: /sys/fs/cgroup
```

The monitor container 72-1 also queries the Kube API server 34 to determine relationship information that identifies the relationship of the resources associated with the worker node 14-1. Based on the relationship information received from the Kube API server 34, the monitor container 72-1 determines that the containers 46-1 and 46-2 run in the pod 44-1, the pod 44-1 runs in the deployment 42, and the deployment 42 runs in the namespace 40-1. The monitor container 72-1 stores the relationship information in a data structure, such as an HR hierarchy file 76 on a storage device 78.

The monitor container 72-1 also determines that the container 54-1 runs in (i.e., is associated with) the pod 52-1, the container 54-2 runs in the pod 52-2, the pods 52-1 and 52-2 are associated with the deployment 50, and the deployment 50 runs in the namespace 40-2. The monitor container 72-1 stores the relationship information in a data structure, such as a Tax hierarchy file 77 on the storage device 78.

The monitor container 72-1 periodically accesses the cgroups 56, 58, 60, or 62 to obtain computer resource utilization values that identify real-time resource utilization values of the corresponding containers, such as memory utilization values, processor utilization values, network utilization values, storage device utilization values, and the like.

The period may be any desired period of time, such as every second, every five seconds, every ten seconds, or any other desired interval of time. Each iteration, the monitor container 72-1 stores computer resource utilization information based on the computer resource utilization values in one or more resource utilization structures, such as, by way of non-limiting example, files that corresponds to the containers, such as a resource utilization file 80 that corresponds to the container 46-1, a resource utilization file 82 that corresponds to the container 46-2, a resource utilization file 84 that corresponds to the container 54-1, and a resource utilization file 86 that corresponds to the container 54-2.

For certain computer resource utilization values, the computer resource utilization information that is stored in the resource utilization files 80, 82, 84, and 86 may be information that can be aggregated to determine aggregate utilization values over a period of time, such as aggregate memory usage, aggregate processor usage, aggregate network usage, and aggregate storage device usage. As an example, a memory resource utilization value may identify an amount of memory used by the container 46-1 at that instant in time. A separate memory resource utilization value may be stored in the resource utilization file 80 each interval. The individual memory resource utilization values may subsequently be aggregated to generate an aggregate memory resource utilization value.

For other computer resource utilization values, the computer resource utilization information stored in the resource utilization file 80 may already constitute aggregate information if the computer resource utilization values contain aggregate information. As an example, a network resource utilization value obtained from the cgroup 56 may identify an aggregate amount of data that has been transmitted by the container 46-1 up to that point in time.

The monitor container 72-2 performs a similar process on the worker node 14-2. Thus, the monitor container 72-2 queries the Kube API server 34 to determine the relationship information that identifies the relationship of the resources associated with the worker node 14-2. Based on the relationship information received from the Kube API server 34, the monitor container 72-2 determines that the containers 48-1 and 48-2 run in the pod 44-2, the pod 44-2 runs in the deployment 42, and the deployment 42 runs in the namespace 40-1. The monitor container 72-2 stores the relationship information in the HR hierarchy file 76 on the storage device 78. The monitor container 72-2 also determines that the container 54-3 runs in (i.e., is associated with) the pod 52-3, the container 54-4 runs in the pod 52-4, the pods 52-3 and 52-4 are associated with the deployment 50, and the deployment 50 runs in the namespace 40-2. The monitor container 72-2 stores the relationship information in the Tax hierarchy file 77 on the storage device 78.

The monitor container 72-2 also, similar to the process described above with regard to the monitor container 72-1, periodically accesses the cgroups 64, 66, 68, and 70 to obtain computer resource utilization values that identify real-time resource utilization values of the corresponding containers 48-1, 48-2, 54-3, and 54-4, respectively, such as memory utilization values, processor utilization values, network utilization values, storage device utilization values, and the like.

The monitor container 72-2 stores computer resource utilization information based on the computer resource utilization values in one or more data structures, such as non-transitory files that correspond to the containers, such as a resource utilization file 88 that corresponds to the container 48-1, a resource utilization file 90 that corresponds to the container 46-2, a resource utilization file 92 that corresponds to the container 54-1, and a resource utilization file 94 that corresponds to the container 54-2.

In this manner, accurate computer resource utilization values can be obtained for all containers executing on all worker nodes of a container orchestration system cluster of nodes. As will be described in greater detail below, such information may be used for any of a number of purposes, such as, by way of non-limiting example, to determine charges associated with computer resource usage of containers, allocation of computer resource usage by namespace, by deployment, and by pod.

It is noted that, because the monitor container 72-1 is a component of the working node 14-1, functionality implemented by the monitor container 72-1 may be attributed to the working node 14-1 generally. Moreover, in examples where the monitor container 72-1 comprise software instructions that program the processor device 16-1 to carry out functionality discussed herein, functionality implemented by the monitor container 72-1 may be attributed herein to the processor device 16-1.

Figure 2:
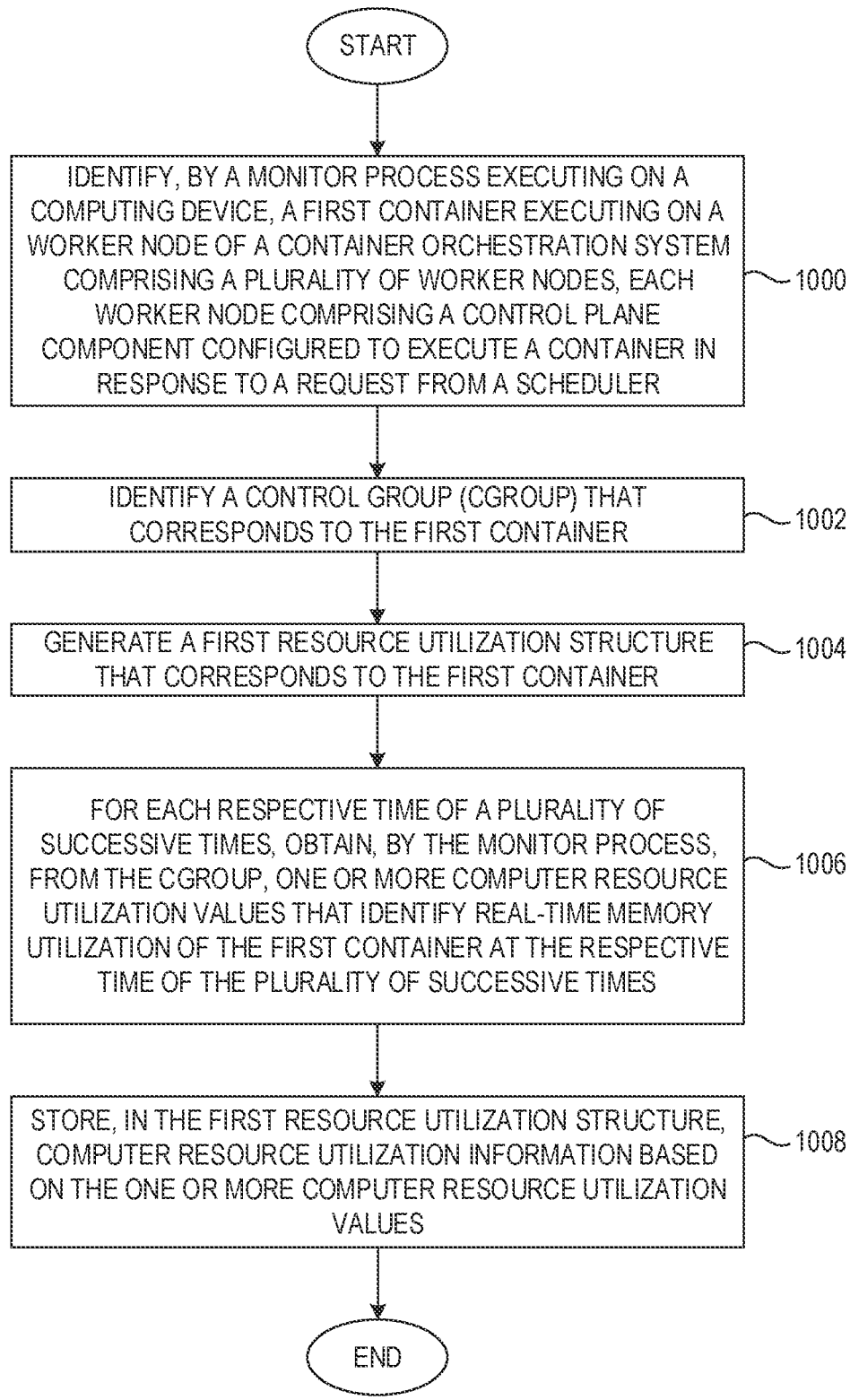
FIG. 2 is a flowchart of a method for obtaining computer resource utilization information for a container according to one example.

FIG. 2 is a flowchart of a method for obtaining computer resource utilization information for a container according to one example. FIG. 2 will be discussed in conjunction with FIG. 1. The monitor container 72-1 (e.g., monitor process) identifies the container 46-1 executing on the worker node 14-1 of the container orchestration system 12 comprising the plurality of worker nodes 14-1, 14-2. Each worker node 14-1, 14-2 includes a control plane component, such as the kubelet 36-1, 36-2, respectively, that is configured to execute a container in response to a request from the scheduler 32 (FIG. 2, block 1000). The monitor container 72-1 identifies the cgroup 56 that corresponds to the container 46-1 (FIG. 2, block 1002). The monitor container 72-1 generates a resource utilization structure, such as the resource utilization file 80 that corresponds to the container 46-1 (FIG. 2, block 1004). The monitor container 72-1, for each respective time of a plurality of successive times, obtains, from the cgroup 56, one or more computer resource utilization values that identify real-time memory utilization of the container 46-1 at the respective time of the plurality of successive times (FIG. 2, block 1006). The monitor container 72-1 stores, in the resource utilization file 80, computer resource utilization information based on the one or more computer resource utilization values (FIG. 2, block 1008).

Figure 3:
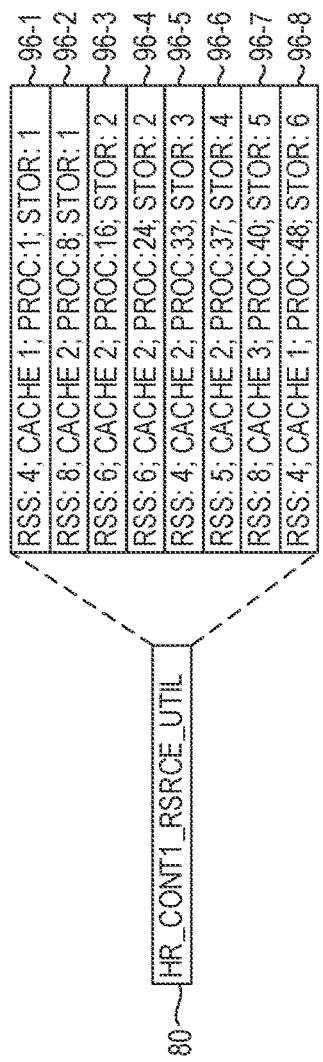
FIG. 3 is a block diagram of a resource utilization file according to one example.

FIG. 3 is a block diagram of the resource utilization file 80 according to one example. In this example, the monitor container 72-1 accesses the cgroup 56 every five seconds. In a first iteration, the monitor container 72-1 obtains real-time memory utilization values from the cgroup 56, such as a resident set size (RSS) that identifies the amount of main memory used by the container 46-1 at that instance in time, and a cache size that identifies the amount of cache memory used by the container 46-1 at that instance in time. The monitor container 72-1 also obtains a real-time aggregate processor utilization value that identifies the aggregate amount of processor seconds that the container 46-1 has used. The monitor container 72-1 also obtains a real-time aggregate storage device utilization value that identifies the aggregate amount of storage that the container 46-1 has used. The monitor container 72-1 generates an entry 96-1 that includes the RSS value, the cache value, the aggregate processor value, and the aggregate storage, and stores the entry 96-1 in the resource utilization file 80.

Five seconds later, the monitor container 72-1 again obtains real-time memory utilization values from the cgroup 56, generates an entry 96-2 that includes the RSS value, the cache value, the aggregate processor value, and the aggregate storage value, and stores the entry 96-2 in the resource utilization file 80. This process repeats every five seconds, resulting in the generation of entries 96-3-96-8, until the container 46-1 terminates, which, in this example, is approximately 40-50 seconds after initiation. Although not illustrated, the resource utilization file 80 may also have metadata, or a separate header record, that identifies related relevant information, such as the name and location of the HR hierarchy file 76.

Figure 4:
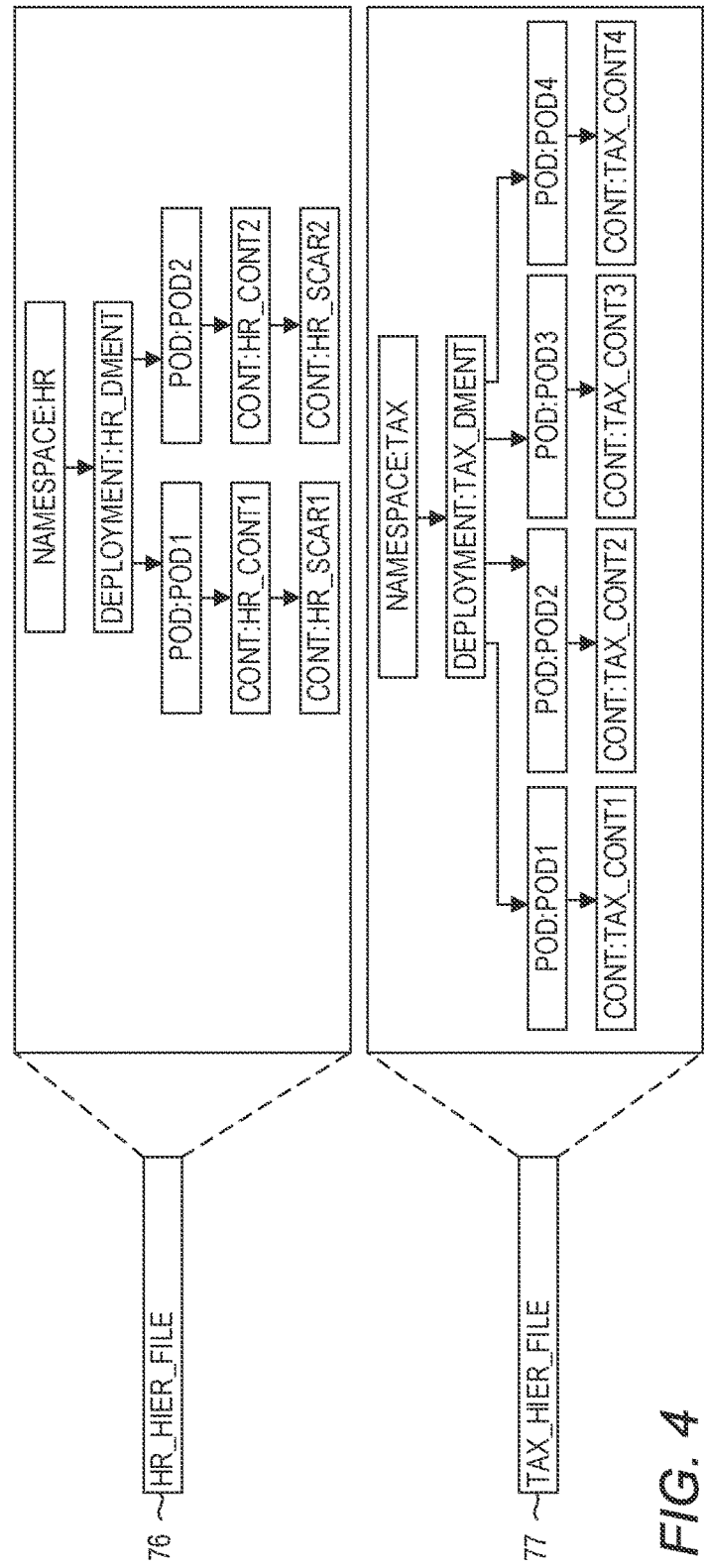
FIG. 4 is a block diagram of two node hierarchy files according to one implementation.

FIG. 4 is a block diagram of the HR hierarchy file 76 and the Tax hierarchy file 77 according to one implementation. The HR hierarchy file 76 contains information that identifies the resources of the namespace 40-1 and the relationship of such resources to one another. The information, illustrated here in graph form, indicates that the namespace 40-1 (HR) has a single deployment 42 (HR_DMENT), that the deployment 42 has two pods 44-1, 44-2 (POD1, POD2), that the pod 44-1 has two containers 46-1, 46-2 (HR_CONT1, HR_SCAR1), and that the pod 44-2 has two containers 48-1, 48-2 (HR_CONT2, HR_SCAR2). The information may be maintained in the HR hierarchy file 76 in any suitable form, such as a linked list, pointers, a graph with nodes and edges, or the like. Although not illustrated, the HR hierarchy file 76 may also maintain related information, such as the particular worker node on which each pod and container executed, names and locations of resource utilization files for each container, and the like.

The Tax hierarchy file 77 contains information that identifies the resources of the namespace 40-2 and the relationship of such resources to one another. The information indicates that the namespace 40-2 (TAX) has a single deployment 50 (TAX_DMENT), that the deployment 50 has four pods 52-1-52-4 (POD1, POD2, POD3, POD4), that the pod 52-1 has one container 54-1 (TAX_CONT1), that the pod 52-2 has one container 54-2 (TAX_CONT2), that the pod 52-3 has one container 54-3 (TAX_CONT3), and that the pod 52-4 has one container 54-4 (TAX_CONT4). Again, although not illustrated, the TAX hierarchy file 77 may also maintain related information, such as the particular worker node on which each pod and container executed, names and locations of resource utilization files for each container, and the like.

Figure 5:
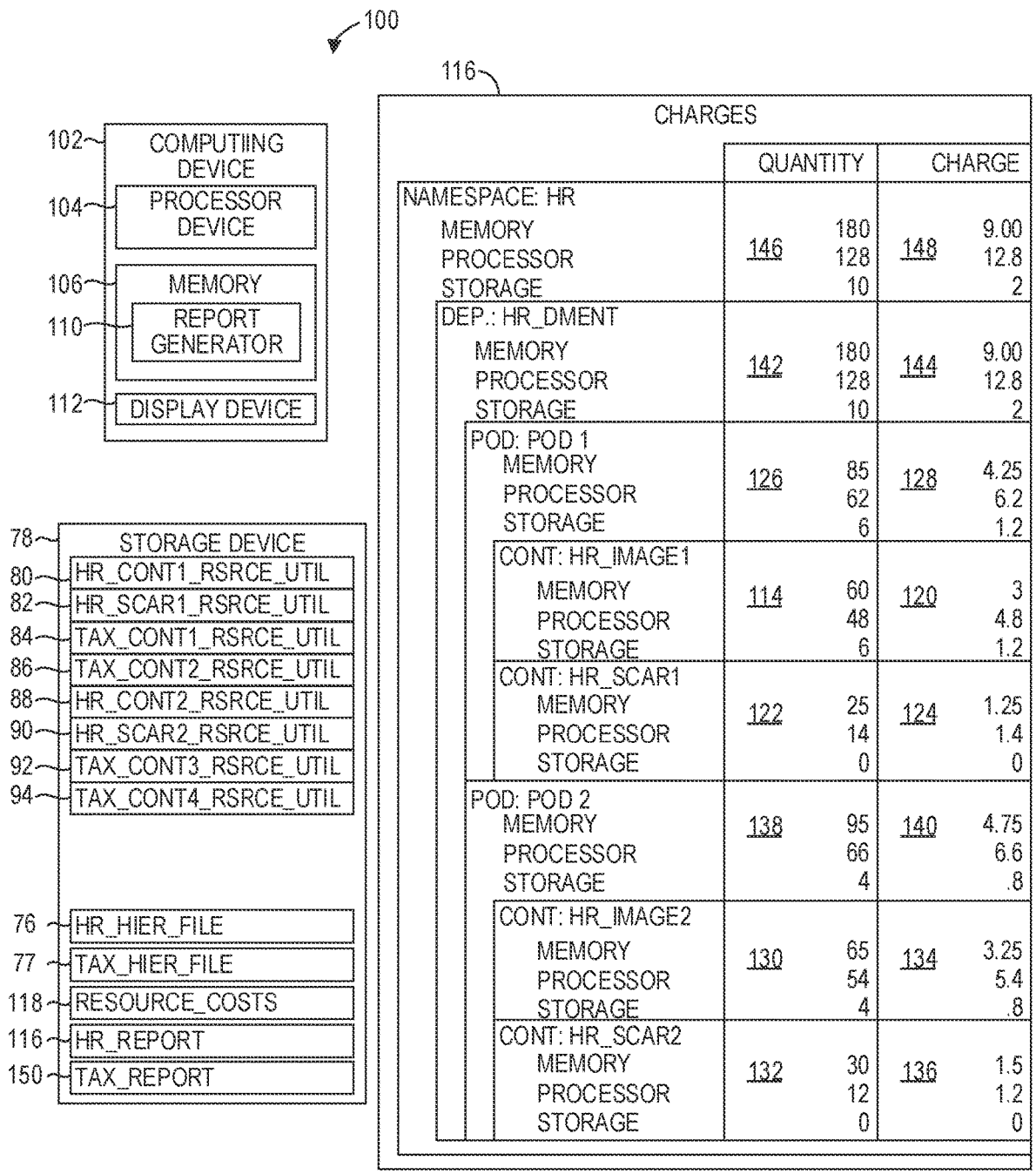
FIG. 5 is a block diagram of an environment suitable for determining computer resource usage at multiple levels of a container orchestration system hierarchy according to one implementation.

FIG. 5 is a block diagram of an environment 100 suitable for determining computer resource usage at multiple levels of a container orchestration system hierarchy according to one implementation. The environment 100 includes a computing device 102 that in turn includes one or more processor devices 104 and a memory 106. The computing device 102 is communicatively coupled to the storage device 78. A report generator 110 is configured to determine computer resource usage at multiple levels of a container orchestration system hierarchy and output the computer resource usage to an output device, such as a display device 112, a file on the storage device 78, a printer, or the like. In this example assume that the report generator 110 receives a request to determine computer resource usage of the namespace 40-1 (FIG. 1), as well as charges associated with such computer resource usage. The namespace 40-1 may no longer exist on the cluster 13 or may still exist on the cluster 13. The request, for example, may be from an operator via a user interface, may be programmatic, or may be in accordance with a schedule.

The report generator 110 accesses the HR hierarchy file 76 and the resource utilization files 80, 82, 88, and 90. The report generator 110, based on the entries 96 in the resource utilization file 80, determines an aggregate memory resource utilization value of 60 GB of memory for the container 46-1. The report generator 110, based on the entry 96-8 of the resource utilization file 80, determines an aggregate processor resource utilization value of 48 seconds for the container 46-1, and an aggregate storage resource utilization value of 6 GB, as reflected in an area 114 of an output report 116. The report generator 110 accesses a resource costs file 118 that indicates a memory charge of five cents per GB of memory, ten cents per second of processor device usage, and twenty cents for each GB of storage. Based on these charges, the report generator 110 determines that memory resource utilization charges for the container 46-1 are three dollars, processor device resource utilization charges for the container 46-1 are four dollars and eighty cents, and storage device resource utilization charges for the container 46-1 are one dollar and twenty cents, as reflected in an area 120 of the output report 116.

In a similar manner, the report generator 110 determines an aggregate memory resource utilization value of 25 GB of memory for the container 46-2, an aggregate processor resource utilization value of 14 seconds for the container 46-2, and an aggregate storage resource utilization value of zero GB of storage for the container 46-2, as reflected in an area 122 of the output report 116. Based on these aggregate resource utilization values for the container 46-2, the report generator 110 determines that memory resource utilization charges for the container 46-2 are one dollar and twenty-five cents, processor device resource utilization charges for the container 46-2 are one dollar and forty cents, and storage device resource utilization charges for the container 46-2 are zero, as reflected in an area 124 of the output report 116.

Based on the HR hierarchy file 76, the report generator 110 determines that the containers 46-1 and 46-2 are associated with the pod 44-1. The report generator 110 aggregates the aggregate container memory utilization value of the container 46-1 (60 GB) and the aggregate container memory value of the container 46-2 (25 GB) to generate an aggregate pod memory utilization value of 85 GB. The report generator 110 similarly determines an aggregate pod processor utilization value of 62 seconds, and an aggregate storage utilization value of 6, as reflected in an area 126 of the report 116. The report generator 110 also aggregates the memory, processor and storage resource charges for the pod 44-1, as reflected in an area 128 of the report 116.

The report generator 110, in a similar manner, determines aggregate container memory utilization values, aggregate processor utilization values and aggregate storage utilization values for the containers 48-1 and 48-2, as reflected in areas 130 and 132 of the report 116, respectively. Based on these aggregate resource values, the report generator 110 determines corresponding charges, as reflected in areas 134 and 136 of the report 116, respectively.

Based on the HR hierarchy file 76, the report generator 110 determines that the containers 48-1 and 48-2 are associated with the pod 44-2. The report generator 110 determines an aggregate pod memory utilization value of 95 GB, aggregate pod processor utilization value of 66 seconds, and an aggregate storage utilization value of 4, as reflected in an area 138 of the report 116. The report generator 110 also aggregates the memory, processor and storage resource charges for the pod 44-2, as reflected in an area 140 of the report 116.

Based on the HR hierarchy file 76, the report generator 110 determines that the pods 44-1 and 44-2 are associated with the deployment 42. The report generator 110 aggregates the aggregate resource utilization values of the pods 44-1 and 44-2 to derive an aggregate deployment memory utilization value of 180 GB of memory, an aggregate deployment processor utilization value of 128 seconds, and aggregate storage utilization value of 10 GB, as reflected in an area 142 of the report 116. The report generator 110 also aggregates the memory, processor and storage resource charges for the deployment 42, as reflected in an area 144 of the report 116.

Based on the HR hierarchy file 76, the report generator 110 determines that the deployment 42 is associated with the namespace 40-1. Because in this example the namespace 40-1 has only one deployment, the aggregate namespace resource utilization values and charges are the same as for the deployment 42, as reflected in areas 146 and 148 of the report 116. In examples where the namespace has multiple deployments, the deployment resource utilization values would be aggregated to generate the aggregate namespace resource utilization values.

The report generator 110 may store the report 116 on the storage device 78, and/or present the report 116 on the display device 112. The report generator 110 may generate a similar report 150 for the namespace 40-2 based on the Tax hierarchy file 77 and the resource utilization files 84, 86, 92, and 94.

It is noted that, because the report generator 110 is a component of the computing device 102, functionality implemented by the report generator 110 may be attributed to the computing device 102 generally. Moreover, in examples where the report generator 110 comprises software instructions that program the processor device 104 to carry out functionality discussed herein, functionality implemented by the report generator 110 may be attributed herein to the processor device 104.

Figure 6:
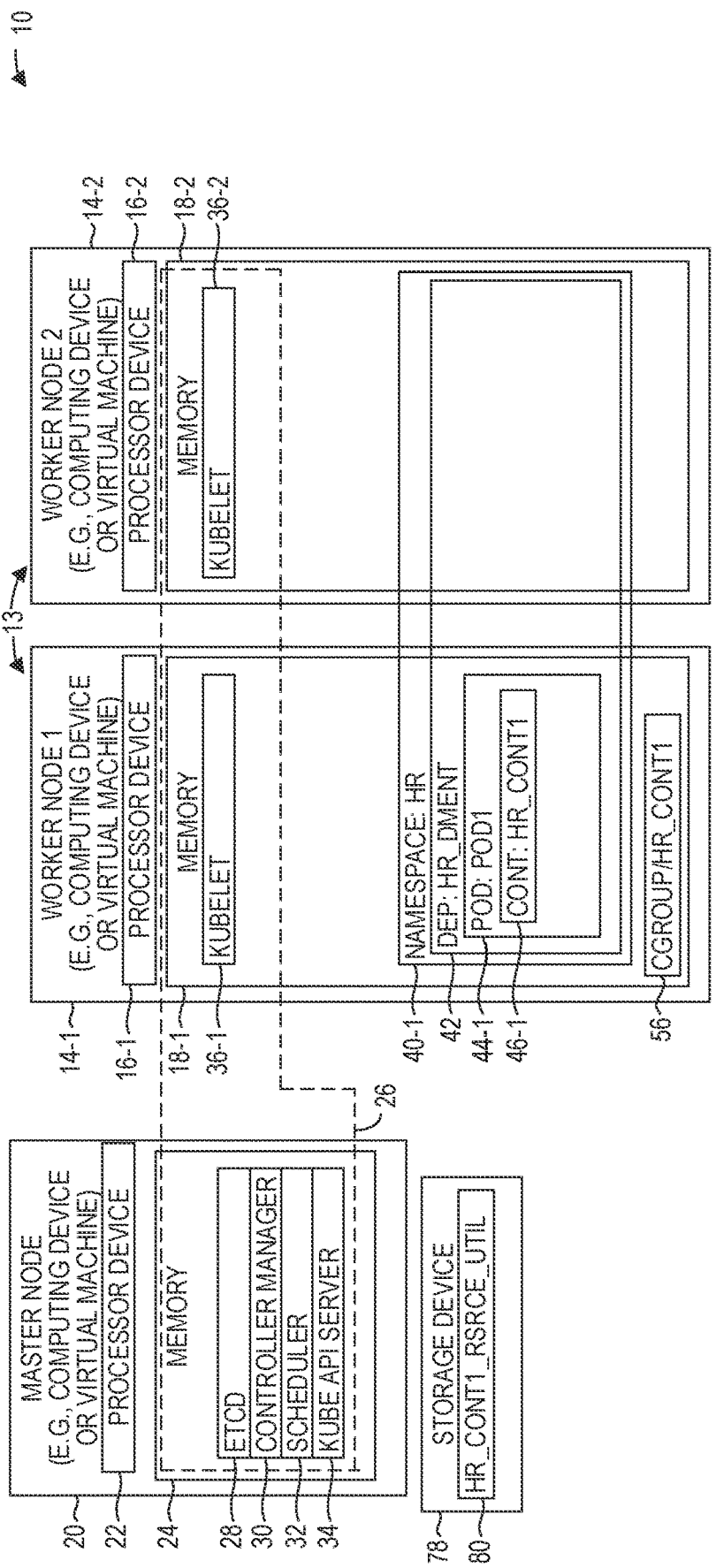
FIG. 6 is a simplified block diagram of the environment illustrated in FIG. 1 according to one implementation.

FIG. 6 is a simplified block diagram of the environment 10 illustrated in FIG. 1 according to one implementation. The environment 10 includes a computer device, such as the worker node 14-1, the memory 18-1 and the processor device 16-1. The processor device 16-1 is to identify the container 46-1 executing on the worker node 14-1 of the container orchestration system 12 comprising the plurality of worker nodes 14-1-14-2, each worker node 14-1-14-2 including a control plane component such as the kubelets 36-1, 36-2 configured to execute a container in response to a request from the scheduler 32. The processor device 16-1 is further to identify the control group 56 (cgroup) that corresponds to the container 46-1. The processor device 16-1 is further to generate a resource utilization structure such as the resource utilization file 80 that corresponds to the container 46-1. The processor device 16-1 is further to, for each respective time of a plurality of successive times, obtain, from the cgroup 56, one or more computer resource utilization values that identify real-time memory utilization of the container 46-1 at the respective time of the plurality of successive times. The processor device 16-1 is further to store, in the resource utilization file 80, computer resource utilization information based on the one or more computer resource utilization values.

Figure 7:
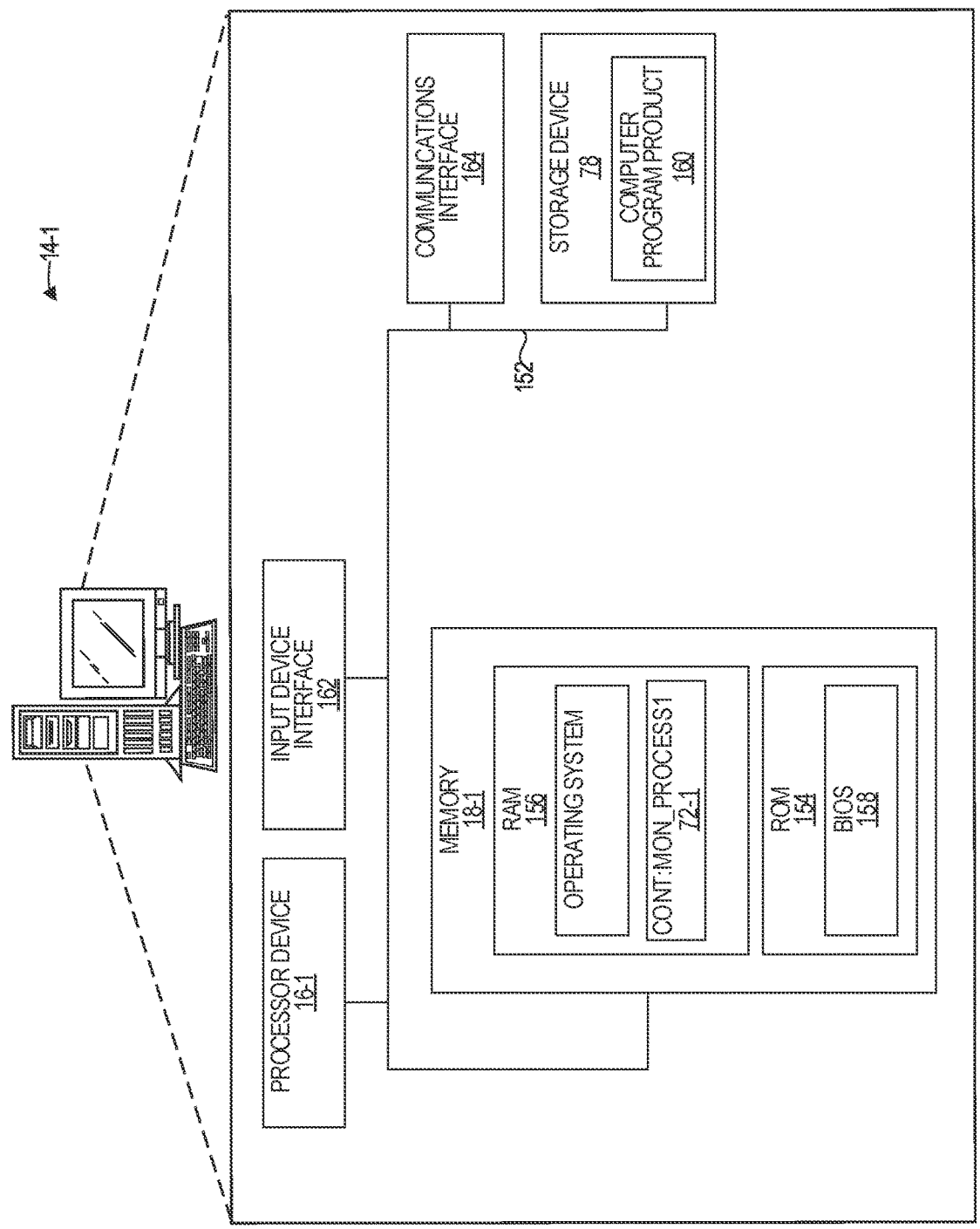
FIG. 7 is a block diagram of a computing device suitable for implementing examples according to one example.

FIG. 7 is a block diagram of the worker node 14-1 suitable for implementing examples according to one example. The worker node 14-1 may comprise any computing or electronic device capable of including firmware, hardware, and/or executing software instructions to implement the functionality described herein, such as a computer server, a desktop computing device, or a laptop computing device. In some implementations, the worker node 14-1 may comprise a virtual machine. The worker node 14-1 includes the processor device 16-1, the system memory 18-1, and a system bus 152. The system bus 152 provides an interface for system components including, but not limited to, the system memory 18-1 and the processor device 16-1. The processor device 16-1 can be any commercially available or proprietary processor.

The system bus 152 may be any of several types of bus structures that may further interconnect to a memory bus (with or without a memory controller), a peripheral bus, and/or a local bus using any of a variety of commercially available bus architectures. The system memory 18-1 may include non-volatile memory 154 (e.g., read-only memory (ROM), erasable programmable read-only memory (EPROM), electrically erasable programmable read-only memory (EEPROM), etc.), and volatile memory 156 (e.g., random-access memory (RAM)). A basic input/output system (BIOS) 158 may be stored in the non-volatile memory 154 and can include the basic routines that help to transfer information between elements within the worker node 14-1. The volatile memory 156 may also include a high-speed RAM, such as static RAM, for caching data.

The worker node 14-1 may further include or be coupled to a non-transitory computer-readable storage medium such as the storage device 78, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 78 and other drives associated with computer-readable media and computer-usable media may provide non-volatile storage of data, data structures, computer-executable instructions, and the like.

A number of modules can be stored in the storage device 78 and in the volatile memory 156, including an operating system and one or more program modules, such as the monitor container 72-1, which may implement the functionality described herein in whole or in part. All or a portion of the examples may be implemented as a computer program product 160 stored on a transitory or non-transitory computer-usable or computer-readable storage medium, such as the storage device 78, which includes complex programming instructions, such as complex computer-readable program code, to cause the processor device 16-1 to carry out the steps described herein. Thus, the computer-readable program code can comprise software instructions for implementing the functionality of the examples described herein when executed on the processor device 16-1. The processor device 16-1, in conjunction with the monitor container 72-1 in the volatile memory 156, may serve as a controller, or control system, for the worker node 14-1 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 16-1 through an input device interface 162 that is coupled to the system bus 152 but can be connected by other interfaces such as a parallel port, an Institute of Electrical and Electronic Engineers (IEEE) 1394 serial port, a Universal Serial Bus (USB) port, an IR interface, and the like. The worker node 14-1 may also include a communications interface 164 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   identifying, by a monitor process executing on a computing device, a first container executing on a worker node of a container orchestration system comprising a plurality of worker nodes, each worker node comprising a control plane component configured to execute a container in response to a request from a scheduler;
   identifying a control group (cgroup) that corresponds to the first container;
   generating a first resource utilization structure that corresponds to the first container;
   for each respective time of a plurality of successive times, obtaining, by the monitor process, from the cgroup, one or more computer resource utilization values that identify real-time memory utilization of the first container at the respective time of the plurality of successive times; and storing, in the first resource utilization structure, computer resource utilization information based on the one or more computer resource utilization values.

2. The method of claim 1 further comprising:
accessing the computer resource utilization information in the first resource utilization structure;
determining a first aggregate memory utilization value based on the computer resource utilization information; and
sending, to an output device, information based on the first aggregate memory utilization value.

3. The method of claim 1 further comprising:
determining a namespace associated with the first container;
determining a second container associated with the namespace;
accessing the computer resource utilization information in the first resource utilization structure;
determining a first aggregate container memory utilization value for the first container based on the computer resource utilization information in the first resource utilization structure;
accessing computer resource utilization information in a second resource utilization structure;
determining a second aggregate container memory utilization value for the second container based on the computer resource utilization information in the second resource utilization structure;
aggregating the first aggregate container memory utilization value and the second aggregate container memory utilization value to generate an aggregate namespace memory utilization value; and
sending, to an output device, information based on the aggregate namespace memory utilization value, and a namespace identifier that identifies the namespace.

4. The method of claim 3 further comprising:
determining a memory charge associated with memory utilization;
determining a namespace memory utilization charge based on the aggregate namespace memory utilization value and the memory charge; and
sending, to the output device, the namespace identifier and the namespace memory utilization charge.

5. The method of claim 4 wherein determining the memory charge associated with the memory utilization comprises:
accessing a plurality of computer resource utilization charges, the plurality of computer resource utilization charges including the memory charge.

6. The method of claim 1 wherein identifying the first container executing on the worker node comprises requesting, by the monitor process from the container orchestration system, information that identifies each container executing on the worker node, and further comprising:
receiving, by the monitor process from the container orchestration system, a plurality of container identifiers including a first container identifier that identifies the first container.

7. The method of claim 6 wherein identifying the cgroup comprises identifying the cgroup based on the first container identifier.

8. The method of claim 1 further comprising:
determining that the first container is associated with a pod;
determining that a second container is associated with the pod;
accessing the computer resource utilization information in the first resource utilization structure;
determining a first aggregate container memory utilization value for the first container based on the computer resource utilization information in the first resource utilization structure;
accessing computer resource utilization information in a second resource utilization structure;
determining a second aggregate container memory utilization value for the second container based on the computer resource utilization information in the second resource utilization structure;
aggregating the first aggregate container memory utilization value and the second aggregate container memory value to generate an aggregate pod memory utilization value; and
sending, to an output device, information based on the aggregate pod memory utilization value, and a pod identifier that identifies the pod.

9. The method of claim 1 further comprising:
determining that the first container is associated with a pod;
determining that a plurality of pods, including the pod, are associated with a deployment;
determining, for each respective pod of the plurality of pods, one or more containers associated with the respective pod;
determining, for each respective pod of the plurality of pods, a corresponding aggregate pod memory utilization value based on computer resource utilization information associated with each of the one or more containers associated with the respective pod;
aggregating the corresponding aggregate pod memory utilization value of each respective pod of the plurality of pods to generate an aggregate deployment memory utilization value; and
sending, to an output device, information based on the aggregate deployment memory utilization value, and a deployment identifier that identifies the deployment.

10. The method of claim 1 wherein the one or more computer resource utilization values further identify real-time processor utilization values of the first container and real-time storage utilization values of the first container.

11. The method of claim 10 further comprising:
accessing the computer resource utilization information in the first resource utilization structure;
determining an aggregate container memory utilization value based on the computer resource utilization information;
determining an aggregate processor utilization value based on the computer resource utilization information;
determining an aggregate storage utilization value based on the computer resource utilization information; and
sending, to an output device, information based on the aggregate container memory utilization value, the aggregate processor utilization value, and the aggregate storage utilization value.

12. A computing device, comprising:
a memory; and
a processor device coupled to the memory to:
identify a first container executing on a worker node of a container orchestration system comprising a plurality of worker nodes, each worker node comprising a control plane component configured to execute a container in response to a request from a scheduler;
identify a control group (cgroup) that corresponds to the first container;
generate a first resource utilization structure that corresponds to the first container;
for each respective time of a plurality of successive times, obtain, by the monitor process, from the cgroup, one or more computer resource utilization values that identify real-time memory utilization of the first container at the respective time of the plurality of successive times; and
store, in the first resource utilization structure, computer resource utilization information based on the one or more computer resource utilization values.

13. The computing device of claim 12 wherein the processor device is further to:
determine a namespace associated with the first container;
determine a second container associated with the namespace;
access the computer resource utilization information in the first resource utilization structure;
determine a first aggregate container memory utilization value for the first container based on the computer resource utilization information in the first resource utilization structure;
access computer resource utilization information in a second resource utilization structure;
determine a second aggregate container memory utilization value for the second container based on the computer resource utilization information in the second resource utilization structure;
aggregate the first aggregate container memory utilization value and the second aggregate container memory utilization value to generate an aggregate namespace memory utilization value; and
send, to an output device, information based on the aggregate namespace memory utilization value, and a namespace identifier that identifies the namespace.

14. The computing device of claim 13 wherein the processor device is further to:
determine a memory charge associated with memory utilization;
determine a namespace memory utilization charge based on the aggregate namespace memory utilization value and the memory charge; and
send, to the output device, the namespace identifier and the namespace memory utilization charge.

15. The computing device of claim 12 wherein to identify the first container executing on the worker node, the processor device is further to request, from the container orchestration system, information that identifies each container executing on the worker node, and wherein the processor device is further to receive, from the container orchestration system, a plurality of container identifiers including a first container identifier that identifies the first container.

16. The computing device of claim 15 wherein to identify the cgroup, the processor device is further to identify the cgroup based on the first container identifier.

17. A non-transitory computer-readable storage medium that includes executable instructions configured to cause a processor device to:
identify a first container executing on a worker node of a container orchestration system comprising a plurality of worker nodes, each worker node comprising a control plane component configured to execute a container in response to a request from a scheduler;
identify a control group (cgroup) that corresponds to the first container;
generate a first resource utilization structure that corresponds to the first container;
for each respective time of a plurality of successive times, obtain, by the monitor process, from the cgroup, one or more computer resource utilization values that identify real-time memory utilization of the first container at the respective time of the plurality of successive times; and
store, in the first resource utilization structure, computer resource utilization information based on the one or more computer resource utilization values.

18. The non-transitory computer-readable storage medium of claim 17 wherein the instructions further cause the processor device to:
determine a namespace associated with the first container;
determine a second container associated with the namespace;
access the computer resource utilization information in the first resource utilization structure;
determine a first aggregate container memory utilization value for the first container based on the computer resource utilization information in the first resource utilization structure;
access computer resource utilization information in a second resource utilization structure;
determine a second aggregate container memory utilization value for the second container based on the computer resource utilization information in the second resource utilization structure;
aggregate the first aggregate container memory utilization value and the second aggregate container memory utilization value to generate an aggregate namespace memory utilization value; and
send, to an output device, information based on the aggregate namespace memory utilization value, and a namespace identifier that identifies the namespace.

19. The non-transitory computer-readable storage medium of claim 18 wherein the instructions further cause the processor device to:
determine a memory charge associated with memory utilization;
determine a namespace memory utilization charge based on the aggregate namespace memory utilization value and the memory charge; and
send, to the output device, the namespace identifier and the namespace memory utilization charge.

20. The non-transitory computer-readable storage medium of claim 17 wherein to identify the first container executing on the worker node, the instructions further cause the processor device to request, from the container orchestration system, information that identifies each container executing on the worker node, and wherein the instructions further cause the processor device to receive, from the container orchestration system, a plurality of container identifiers including a first container identifier that identifies the first container.

* * * * *